3,350,231
FUEL CELL ELECTRODE AND METHOD OF
USING SAME
Robert R. Hentz, Pennington, N.J., assignor to Mobil Oil
Corporation, a corporation of New York
No Drawing. Filed May 14, 1963, Ser. No. 280,467
5 Claims. (Cl. 136—86)

This application is a continuation-in-part of Ser. No. 223,832, filed Sept. 14, 1962, now U.S. Patent 3,258,404.

This invention relates to electrodes for a fuel cell, particularly to electrodes capable of activating fuel cell reactants to an increased extent over that conventionally possible to the end of facilitating electrode processes in the fuel cell.

A major difficulty in the way of perfecting fuel cells, at least those intended for use with cheap hydrocarbon fuels, is the lack of suitably effective catalysts for catalyzing the conversion of the fuel to a state in which it is electrochemically usable. There is general agreement that hydrocarbons are desirable as fuels, just as there is agreement that more effective catalysts for such fuels are also desirable. In the absence of more suitable catalysts, high temperature operation of fuel cells appears to be increasingly investigated, the thought being to thermally activate relatively inert fuels to a level at which increase electrochemical reaction rates are possible, but this approach, of course, abandons the advantage of operation at ambient temperatures.

According to the invention, it is proposed to increase the electrochemical activity of fuel cell electrodes by incorporating in them a material capable of being made radioactive, thereby to produce self-irradiated electrodes, i.e., those having an internal source of radiation, to influence the fuel cell reactions. The radioactivity is induced in the material after incorporation in and preparation of the electrode, but just prior to use, so that during preparation the material is not radioactive and does not hinder the preparation procedure by raising problems of safety. Furthermore, the radioactive electrode is safe to use and presents no problem of radioactive contamination.

Essentially the invention comprises a fuel cell electrode incorporating an element having an abundant isotope of large thermal neutron activation cross section and capable of being activated to a state of radioactivity. The isotope may be designated a nuclide, which prior to activation is a stable nuclide but after activation is a radioactive nuclide or radionuclide. Preferably it is a purely beta-emitting radionuclide.

In a preferred case the electrode may be built up from a mechanical support that is electron conductive, a conventional catalyst, and a stable nuclide of the kind described.

The support, which suitably may be porous carbon, provides mechanical strength for the electrode and serves to draw off electrons for the external circuit. The support may have any conventional form or shape, including plates and tubes, particularly with carbon supports, or it may comprise metal grids, gauzes, screens, and meshes, used singly or in pairs. As will be understood, the resulting electrode will generally have the form or shape of the support.

The catalyst may be a conventional material, such as palladium; it aids in the adsorption and/or splitting of the fuel molecules and helps to reduce the activation energy required for initiating the electrochemical oxidation reaction. Where the fuel at least in part is initially converted to produce hydrogen, as noted below, the catalyst performs its usual function of chemisorbing the molecular hydrogen, splitting the latter to form chemisorbed hydrogen atoms, and catalyzing the electrochemical oxidation of the latter to produce one electron per hydrogen atom. The electrons, as is understood, travel along the fuel electrode (anode), or electron-conductive support thereof, and then out through the external circuit to the oxygen electrode (cathode).

The stable nuclide may be a material in the elemental form or a salt or other compound thereof. When activated to a radioactive state, the nuclide may act to bring about the cracking and/or dehydrogenation of the hydrocarbon fuel, and the splitting of the resulting molecular hydrogen. Thus, it may enhance the catalytic activity of the catalyst, and/or it may deposit energy int he electrode which may then be transferred to the reactants. The nuclide becomes radioactive when activated by a suitable thermal neutron flux, for which it has a cross section of at least 1 barn, preferably at least 5 or 10 barns, and more preferably at least 50 barns. The abundance of the nuclide is at least 0.1%, but preferably at least 1 or 2%, and of course it can be as high as 50 or 100%. Useful nuclides, noted in the table below, include thulium–169, lutetium–176, cobalt–59, selenium–74, indium–113, cesium–133, samarium–152, terbium–159, ytterbium–168, ytterbium–174, hafnium–180, tantalum–181, rhenium–185, rhenium–187, mercury–202. Preferred nuclides are those which on activation yield radioactive isotopes that emit purely beta radiation, such as thulium–169, which has an abundance of 100% and a thermal neutron activation cross section of about 130±30 barns; its radioactive isotope, thulium–170, has a half life of about 129 days and emits only beta radiation, the maximum energy of which is about 0.98 mev. Lutetium–176 and rhenium–185 also produce purely beta-emitting radionuclides. Of further interest is natural thallium, which when activated produces purely beta- emitting isotopes one of which has a half life of 2.7 years and emits beta radiation of 0.87 mev. energy. It will be understood that two or more nuclides may be present in the electrode.

The concentration in the electrode of the stable nuclide should be large enough to produce a desired effect when the activated electrode is subsequently used; for most purposes the concentration is at least 1%, and may range to 5, 10, or 25% by weight, or more, of the electrode. It may also be as low as 0.1% by weight. The concentration of the catalyst component is conventional, ranging say from 0.1 to about 30% by weight of the electrode.

In constructing the built-up electrode, it is appropriate to mix the nuclide and catalyst, each in the form of a salt or other compound in solution, and to apply the mixture to the porous support, as by soaking the support in the mixture as often as necessary. It will be understood that separate impregnation of the support by the catalyst and nuclide solutions is feasible. After drying, the structure is heated to at least 400° F., preferably in an inert atmosphere like nitrogen, for several hours to decompose the soluble salts to the metal or an oxide thereof. The result is to secure a thorough distribution of the catalyst and nuclide, each in discrete, finely divided form, throughout the structure. If desired, after impregnation of the support and drying, the catalyst and nuclide compounds may be left in compound form. Another procedure comprises mixing the nuclide and catalyst compounds, each in finely powdered form, then pressing the mixture about the porous support, using suitable binders if necessary to hold the mass together, followed by a heating step. Or powdered catalyst and powdered nuclide, both in metal form, may be pressed together about a preferably metallic support and sintered; or they may be pressed together in absence of the support and sintered, after which the mass may be placed between a pair of support members in the form of metal grids, guazes, etc. and fastened in a suitable way. As an example, a porous carbon support in the form of a sheet or tube is first produced by the compression molding of carbon particles of uniform size, such as fine particles of graphite and lamp black, using a binder like pitch. After a conventional heat treatment, the resulting porous structure may have a porosity in the range of 10 to 35%. It may be soaked in aqueous solution containing about 10% by weight of palladium nitrate and 10% by weight of thulium nitrate, then heated to decompose these compounds and form elemental palladium and thulium. Hydrogen may be present during the heating. The resulting electrode comprises the porous carbon support impregnated with about 0.5% by weight of palladium and about 1 to 2% by weight of thulium-169. Other illustrative three-component (support, catalyst, nuclide) electrodes are copper, rhenium, lutetium; and lead, vanadium, cobalt.

The thickness of the electrode is variable; suitably it may range up to ¼ inch, for example from 1/16 to ¼ inch. Its pore size may vary from about 0.05 to 50 microns and preferably is uniform.

The electrode, or rather the stable nuclide component thereof, may be activated by exposure for a given time to the thermal neutron flux of a nuclear reactor, as by placing one or more electrodes in one or more beam tubes of suitable size in a reactor. The neutron flux may range from $10^{11}$ neutrons/sq. cm./sec. to any desirable upper limit and the exposure time from several days to any desired interval, preferably for at least 13 days. At these flux values and exposure times the electrode becomes suitably activated, i.e., the original stable nuclide is transformed into a radionuclide, and the latter commences to undergo the process of radioactive decay, emitting charged particles or radiation which, immediately after the conclusion of the exposure, may vary from 0.01 to 100, preferably 0.1 to 50 megarads/hour, these values being at least sufficient to produce measurable radiation-chemical changes. The activated electrode may have a specific activity, or rate at which it emits charged particles, of 0.02 to 200, preferably 0.2 to 100, curies/gram. At the end of one half life of the radionuclide, the emitted dose rate and specific activity values would be only half of the values obtaining immediately after exposure to the neutron flux. The stable nuclide, thulium-169, is transformed to the radionuclide, thulium-170, which emits beta radiation having an energy of 0.98 mev.; this radiation is not only emitted by the electrode but also is absorbed by it, as described below. Thulium-170, with a half life of 129 days, will emit useful radiation for a period of many months, after which the electrode incorporating it may be reactivated in the nuclear reactor, preferably after addition of fresh amounts of stable nuclide. After decay of a radionuclide, another element is formed, and this simply remains in the electrode, where it may have value as a catalytic material and/or aid in the transfer of energy to the reactants.

The nature or kind of radiation emitted by the electrode will depend on the radionuclide, and in turn on the original stable nuclide. While the latter may be chosen to secure various kinds of radiation, it is preferred to use stable nuclides which are converted to purely beta-emitting radionuclides, preferably with a long half life. The beta emission may be electrons or positrons. Because of the comparatively short range of beta particles, substantially all of their energy is absorbed within the fuel cell, and generally within the fuel electrode, particularly the so-called reaction zone interface thereof comprising the fuel-electrolyte-electrode interface. In effect, the electrode is a self-irradiating one; thus, loss of energy is reduced and a much higher efficiency of energy absorption and utilization is obtainable. Furthermore, radiation hazard is greatly decreased; only the associated bremsstrahlung of a beta emitter requires some attention, and provision for this effect can be made by allowing a small distance and/or some shielding, as the bremsstrahlung energy associated with 1 mev. electrons is only about 0.1%. The distance or space is easily provided in a fuel cell, so that aside from this, only conventional construction and equipment are required for the cell.

While other emitted radiations are useful, such as gamma rays, and while appropriate stable nuclides are available for obtaining gamma emitters, examples of which appear below in the table, their use is less preferable owing to the necessity for additional shielding, the extent of which is greater than for beta radiation. In fact, the latter can be accommodated merely by spacing, but this is not practical for gamma rays. However, with suitable shielding, gamma rays are feasible, as are emitters which yield one kind of radiation followed by one or more other kinds, examples of which are also given.

The following table lists some useful stable nuclides, giving chemical symbol and mass number of each together with their abundance and thermal neutron cross section (sigma). The latter quantity is given as an average value. Also listed are the half lives (T) and radiations of the radionuclides formed from the nuclides. In each case the radionuclide has a mass number one unit greater than that of the stable nuclide. As to the other notation, y stands for years, d for days, h for hours, e for electron and IT for isomeric transition. As is apparent, the half life T may vary widely; preferably it should be as long as possible. In column (5) the figures in parentheses represent maximum energies in mev., only a few such values being given by way of illustration, although generally speaking the radiation energy may range both lower and higher than the values noted; for example, it may be 0.1 mev., or less, and may be 1 or 2 mev., or more. Energies of 0.4 mev. and up are preferred. In column (5) "beta" stands for beta particles and "gamma" for gamma radiation.

TABLE

| (1) Nuclide | (2) Percent Abundance | (3) Sigma | (4) T | (5) Radiations |
| --- | --- | --- | --- | --- |
| Tm–169 | 100 | 130 | 129 d | Beta (0.98). |
| Lu–176 | 2.6 | 4,000 | 6.8 d | Beta (0.47). |
| Co–59 | 100 | 20 | 5.3 y | Beta, gamma. |
| Se–74 | 0.87 | 26 | 123 d | Gamma, e. |
| In–113 | 4.23 | 56 | 49 d | e, Beta, IT (0.19). |
| Cs–133 | 100 | 26 | 2.3 y | e, Beta, gamma. |
| Sm–152 | 26.63 | 140 | 47 h | Do. |
| Tb–159 | 100 | >22 | 73 d | Do. |
| Yb–168 | 0.14 | 11,000 | 32 d | Gamma. |
| Yb–174 | 31.84 | 60 | 101 h | Beta, gamma. |
| Hf–180 | 35.44 | 10 | 46 d | e, Beta, gamma. |
| Ta–181 | 100 | 19 | 111 d | Do. |
| Re–185 | 37.07 | 100 | 92 h | Beta (1.07). |
| Re–187 | 62.93 | 75 | 18 h | e, Beta, gamma. |
| Hg–202 | 29.8 | 3.8 | 47 d | Do. |

During irradiation of the electrode, it will be apparent that not only the nuclide but also the components of the support and of the catalyst are subjected to the influence of the neutron flux. In view of this, it is desirable that these support and catalyst components are not radioactivated, or, in other words, that they have a thermal neutron activation cross section of less than one barn. For example, one of the naturally occurring isotopes of palladium has a cross section of less than one barn, making palladium particularly suitable as a catalyst or as a support component, since the other isotopes of palladium give rise to pure beta emitters. As, however, the great majority of desirable component materials are activated, it is preferred to select materials which, on activation, emit purely beta radiation, such as carbon or lead, which are useful supports.

Another suitable procedure, and one which increases the choice of materials for the support and the catalyst, is to select activatable components which, although they emit the more penetrating and less preferred gamma radiation, have such a short lifetime, that the gamma activity can be allowed to decay by simply letting the electrode to stand for a time prior to use. For example, a component like naturally occurring nickel upon thermal neutron activation ultimately leads to nickel-65, a gamma emitter having a half life of only 2.6 hours, and by allowing it to decay for several days, or even a week or two, the undesirable gamma radiation can be eliminated. It will be apparent that in some cases a delay of a week or two is quite short and easily tolerated. Again, a material like rhodium-103 is activated by thermal neutrons to give rhodium-104, a gamma emitter having a half life of only 42 seconds which can be allowed to decay within a few hours or a day. In view of this, nickel and rhodium-103 are considered to be useful as catalyst components, it being understood that when an electrode containing them is used in a fuel cell, they will not emit gamma radiation. Other catalyst components of this class are vanadium, copper, manganese, tungsten, molybdenum, and rhenium-187. Support materials of this class include copper, manganese, nickel, and aluminum.

Finally, even though a material gives rise to a gamma emitter of long lifetime, it is still possible to make use of its otherwise desirable support and/or catalyst properties by resorting to shielding of the resulting electrode and/or fuel cell in which it is employed. Such materials include support components like iron, cobalt, titanium, osmium, silver, stainless steel and Nichrome, the latter comprising nickel-chromium and iron-nickel-chromium alloys, and catalyst components like iron, osmium, cobalt, silver, and chromium.

It will be understood that the foregoing electrode constructions are illustrative and that other constructions are within the purview of the invention. Thus, the electrode may comprise a support that is also catalytically active and the nuclide. The support-catalyst may be constructed from such materials as palladium, silver, nickel, and cobalt, which not only are catalytic but also suitable for use as a support. The nuclide may be any of those described, and may be incorporated in the electrode by the procedures described, including impregnation from a solution, or by application as a powdered metal followed by sintering, or by precipitation followed or not by chemical treatment to obtain the nuclide in metal form. As described, appropriate steps are used in these procedures to obtain good distribution of the finely sized nuclide throughout the electrode, and a suitable technique to this end comprises mixing all the electrode components, in finely divided form, and then forming to a desired shape.

In another construction the electrode may comprise a support and a nuclide which is also catalytically active, i.e., a catalyst-nuclide such as cobalt or rhenium. These nuclides have catalytic as well as radioactive properties and may be applied to any of the described supports in the manner set forth.

In another construction the support itself may also be the nuclide and the catalyst may be added to the same. Thus, cobalt may be the support-nuclide, and may have incorporated thereon any of the foregoing catalysts. Furthermore, as cobalt is also catalytic, it may function as the entire electrode, being a support-catalyst-nuclide material.

In all of the electrodes, it will be understood that the nuclide and catalyst are chosen so that there is no interference with the catalyst surface. Also, the use of the electrodes is not restricted to any particular operation of the fuel cell. Thus, whatever operation is used, it is only necessary that the radiation from the radionuclide shall irradiate the above-noted reaction zone interface comprising the electrode-fuel-electrolyte interface. For example, considering a fuel cell having spaced-apart electrodes with an electrolyte compartment therebetween, the fuel may be introduced to the porous fuel electrodes on the side remote from the electrolyte so that at least a portion of the fuel passes through the porous electrode. Or the fuel and electrolyte may be mixed and passed to the fuel electrode on the side remote from the electrolyte so that at least a portion of the mixture passes through the pores in the electrode and into the electrolyte compartment. Or the fuel-electrolyte mixture may be introduced to the electrolyte compartment, through which a flow may be maintained, so that the mixture is absorbed by the pores in that side of the fuel electrode adjacent the electrolyte compartment. Where fuel-electrolyte mixtures are used, the fuel should not undergo a reaction or interfere with the processes at the oxygen electrode, although it may be noted that the occurrence of such reaction or interference may be controlled by conventional measures.

The electrolyte may be conventional, such as an aqueous solution of an acid, or base, or ionizable salt. It may be a conventional ion-permeable resin in the form of a membrane. It will be understood that the electrolyte does not react with the fuel nor with the fuel electrode The remaining construction of the fuel cell, including the oxygen electrode, may be conventional. The preferred beta radiation has only a short range in condensed phases such that all of it is absorbed by the reaction zone interface described above, or by the electrode material, reactants, and electrolyte material adjacent such interface.

The electrodes are of value with many types of fuel cells, i.e., cells employing various fuels and electrolytes. In particular, the fuel may be any of the conventional normally liquid hydrocarbons such as pentane, isopentane, hexane, heptane, octane, the branched C-6, C-7, and C-8 alkanes, cyclohexane, methylcyclohexane, methylcyclopentane, benzene, etc. Normally gaseous hydrocarbons like methane and ethane are useful, as well as propane, butane, isobutane, ethylene, propylene, etc. Another suitable fuel is hydrogen. Other fuels include oxygenated hydrocarbons like alcohols, aldehydes, ketones, esters, ethers and carboxylic acids, these comprising organic compounds containing only carbon, hydrogen, and oxygen. Ammonia and hydrazine are also useful.

The low reactivity of many hydrocarbon fuels in fuel cells, and the resulting inability to secure a more useful EMF and current, is not because of thermodynamic limitations but rather is a problem of activation of the fuel. For example, the oxidation of a fuel as refractory as methane is thermodynamically allowable, as may be shown, yet it is considered inert. Thus, the oxidation of one mole of methane at 25° C., with all reactants and products in their standard states, involves a free energy change of $-196$ kcal., which in electrochemical terms is equivalent to a potential of $+1.06$ volts, this change indicating that the reaction is thermodynamically allowable and that it should proceed spontaneously. Conventional catalysts may help reduce the activation energy required for the fuel reaction, but it is apparent that activation barriers still exist; the problem therefore is one of circumventing, reducing, or eliminating these barriers to facilitate the desired electrode reactions.

In this connection the invention is contemplated to be of value for hydrocarbon fuels in general, as well as for those difficult to activate by conventional catalysts. As indicated earlier, it is considered that a part of the effective radiation from the radionuclide-containing electrode may be absorbed by the catalyst present in the electrode, with a consequent enhancement of its catalytic action, or with a consequent transfer of energy to the fuel cell reactants in contact therewith. It may be appreciated, too, that radiation energy may not only be deposited in the catalyst but also in the electrode as a whole and transferred to the reactants, and further that a major portion of the radiation energy may be utilized in this way. While the invention is not to be limited by theory, this mechanism of the action seems particularly feasible when part or all of the electrode is constructed from materials in subdivided form, it being considered that during irradiation, states or centers of excitation are formed in the materials. These excitation centers may then transfer energy to the reactants as the latter diffuse through the pores of the electrode, and the so-activated reactants are induced to undergo the desired electrochemical reactions.

It may be seen that the invention provides worthwhile advantages in the operation of fuel cells. Only the stable nuclide-containing fuel electrode need be activated in the nuclear reactor, or other source of neutrons, and after removal and installation in a fuel cell, it may be used with a variety of fuels to produce electric power.

Convenience of preparation and activation of the electrodes are noteworthy. There is no radiation hazard in their preparation because they are first prepared by standard procedures and equipment and then activated.

With a purely beta-emitting radionuclide in the electrode, the fuel cell is usable without shielding or remote control handling, and there is substantially complete absorption of radiation energy with the advantages of increased efficiency and safety.

It will be understood that the invention is capable of obvious variations without departing from its scope.

In the light of the foregoing description, the following is claimed.

1. In a method of operating a fuel cell having an anode electrode and a cathode electrode with an electrolyte compartment therebetween, the improvement which comprises forming said anode electrode comprising an electron-conductive support, a catalyst, and a stable inactive nuclide distributed therein and therethrough in discrete subdivided form, said nuclide being characterized by yielding, upon activation in a thermal neutron flux, a radionuclide, subjecting said anode to said neutron flux to activate the nuclide to produce said radionuclide, then removing the activated anode from said flux and using the same in a fuel cell, introducing fuel to the anode, said radionuclide acting to irradiate said anode to deposit energy therein, and said anode transferring said energy to fuel anode-electrolyte interfaces therein to activate fuel reactions, and electrochemically oxidizing the fuel at said anode by the aid of said radiation to generate a current.

2. In a method of operating a fuel cell having an anode electrode and a cathode electrode with an electrolyte compartment therebetween, the improvement which comprises forming said anode electrode with a stable inactive nuclide distributed therein characterized by yielding, upon thermal neutron activation, a radionuclide, subjecting said anode to a neutron flux to activate the nuclide to produce said radionuclide, then removing the activated anode from said flux and using the same in a fuel cell where it emits radiation, introducing fuel to the anode, and electrochemically oxidizing the fuel at said anode by the aid of said radiation to generate a current.

3. In a fuel cell having an anode electrode and a cathode electrode with an electrolyte compartment therebetween, the improvement wherein said anode electrode comprises as an intermediate fuel reaction activating agent a stable nuclide distributed through said anode electrode, said nuclide being selected from the class consisting of thulium-169, lutetium-176, rhenium-185 and natural thallium.

4. In a fuel cell having an anode electrode and a cathode electrode with an electrolyte compartment therebetween, the improvement wherein said anode electrode comprises an electron-conductive support, a catalyst for influencing fuel reactions at said anode electrode, and as an intermediate activating agent a stable nuclide distributed through said anode electrode, said nuclide being selected from the class consisting of thulium-169 lutetium-176, rhenium-185 and natural thallium.

5. In a method of operating a fuel cell, having an anode electrode and a cathode electrode with an electrolyte compartment therebetween, said anode electrode having a stable inactive nuclide distributed therein, the improvement which comprises subjecting said anode electrode to a neutron flux to activate the nuclide to produce a radionuclide, removing the activated anode electrode from said flux and using the same in a fuel cell where it emits radiation, introducing fuel to said fuel cell, and electrochemically oxidizing fuel at said anode electrode to generate a current.

References Cited

UNITED STATES PATENTS 3,255,044 6/1966 Powers et al. _____ 136—86
3,255,046 6/1966 Ghormley _____ 136—86

OTHER REFERENCES

Radioisotope, Activated Fuel Cell Electrodes, Lang, M., IRE Trans. on Mil. Electronics, Mil 5–6, January 1962, pages 58–62.

Introduction to Radiochemistry, Friedlander et al., John Wiley & Sons, Inc., New York, 1949, p. 72 and appendix relied on.

WINSTON A. DOUGLAS, *Primary Examiner.*

N. P. BULLOCH, O. F. CRUTCHFIELD,
*Assistant Examiners.*